(12) United States Patent
R

(10) Patent No.: US 8,839,361 B2
(45) Date of Patent: Sep. 16, 2014

(54) ACCESS CONTROL SYSTEM AND METHOD WITH GPS LOCATION VALIDATION

(71) Applicant: Honeywell Internatioanl Inc., Morristown, NJ (US)

(72) Inventor: Aneesh Kumar R, Kerala (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/758,559

(22) Filed: Feb. 4, 2013

(65) Prior Publication Data

US 2014/0223546 A1 Aug. 7, 2014

(51) Int. Cl.
*H04L 9/32* (2006.01)
*G06F 21/31* (2013.01)

(52) U.S. Cl.
CPC .................................... *G06F 21/31* (2013.01)
USPC .................................. 726/2; 726/17; 726/19

(58) Field of Classification Search
CPC . G06F 2221/2111; G06F 21/31; H04L 63/10; H04L 63/101; H04L 63/107; H04L 63/08; H04W 12/00; H04W 12/06; H04W 12/08
USPC ...................... 380/258, 270; 726/2–5, 16–21; 713/168–170
See application file for complete search history.

(56) References Cited

U.S. PATENT DOCUMENTS

| 6,978,023 | B2 * | 12/2005 | Dacosta | 380/258 |
| 8,437,742 | B2 * | 5/2013 | Garskof | 455/411 |
| 8,533,793 | B2 * | 9/2013 | Hanna, Jr. | 726/5 |
| 8,625,796 | B1 * | 1/2014 | Ben Ayed | 380/258 |

* cited by examiner

*Primary Examiner* — Hosuk Song
(74) *Attorney, Agent, or Firm* — Husch Blackwell LLP

(57) ABSTRACT

An access control system and method with location validation are provided. The method can include receiving a request from an authentication factor, identifying a location module associated with the authentication factor, identifying a location of the location module, and determining whether the location module is within a predetermined distance from the authentication factor or a control system, including an access panel of the control system, that received the request from the authentication factor. When the location module is within the predetermined distance from the authentication factor or the control system that received the request from the authentication factor, the method can include granting the request received from the authentication factor. However, when the location module is not within the predetermined distance from the authentication factor or the control system that received the request from the authentication factor, the method can include denying the request received from the authentication factor.

20 Claims, 2 Drawing Sheets

ACCESS CONTROL SYSTEM AND METHOD WITH GPS LOCATION VALIDATION

FIELD

The present invention relates generally to access control systems. More particularly, the present invention relates to access control systems and methods with GPS location validation.

BACKGROUND

Access control systems are known in the art, and many known access control systems employ an authentication factor for gaining access to a secured area. For example, an authentication factor can be an access card or a PIN number. The access card can be presented to a reader, or the PIN number can be entered into a keypad.

Unfortunately, the use of authentication factors does not provide complete security. For example, the access control system does not verify that the person using the authentication factor is the authorized user of the authentication factor. That is, known access control systems do not verify that the person using an access card or entering a PIN number to request access to a secure area is the person who was issued the access card or PIN number. Accordingly, one person can misuse another person's access card or PIN number to gain access to a secured area. In this manner, an unauthorized person can gain access to a secured area, where valuable physical, logical, or intellectual property can be located. Events generated by the unauthorized person's access can also be recorded and incorrectly attributed to the authorized user of the authentication factor.

In view of the above, there is a continuing, ongoing need for an improved access control system.

DETAILED DESCRIPTION

Figure 1:
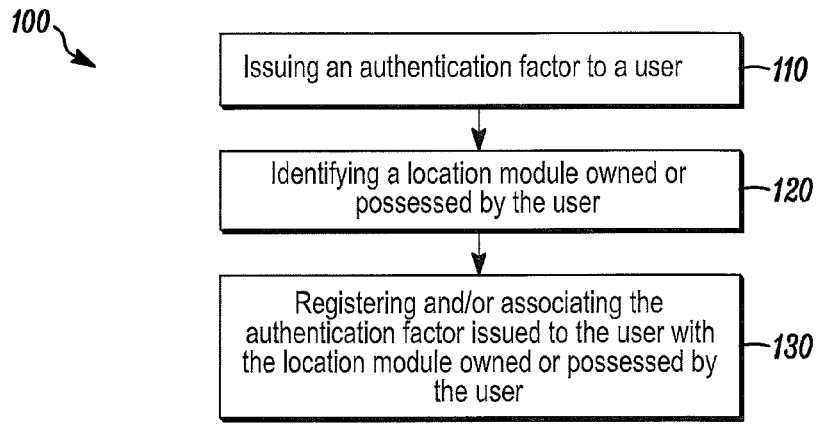
FIG. 1 is a flow diagram of a method of issuing an authentication factor in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include an access control system and method with GPS (Global Positioning System) location validation. For example, systems and methods disclosed herein can verify a user using an authentication factor by identifying a GPS location of a user authorized to use the authentication factor. When the location of the user authorized to use the authentication factor is the same as or within a predetermined distance from the authentication factor and/or the access control system to which the authentication factor was presented and/or an access panel of the access control system that received the request from the authentication factor, then systems and methods can determine that the user using the authentication factor is the same user that is authorized to use the authentication factor and thus, grant the requested access to that user.

In accordance with disclosed embodiments, when an authentication factor, such as an access card or a PIN number, is issued to a user, systems and methods can register and/or associate a location module, such as a GPS module, with the authentication factor. For example, the location module can be the person's cellular phone, smart phone, personal digital assistant, or any other GPS module as would be known by those of skill in the art. In some embodiments, the location module can include a software application or program running thereon to provide location information of the device.

When a user employs an authentication factor, for example, by presenting an access card or entering a PIN number to gain access to a secure area, systems and methods can identify a location of a location module registered and/or associated with the authentication factor that was employed. It is to be understood that some embodiments disclosed herein assume that the person authorized to use an authentication factor is a person in possession of an associated location module. Accordingly, based on the identified location of the location module, systems and methods can determine whether to grant or restrict access to the user employing the authentication factor.

For example, in some embodiments, if the identified location of the location module is within a predetermined distance from the presented authentication factor and/or the access control system to which the authentication factor was presented and/or an access panel of the access control system that received the request from the authentication factor, then systems and methods can grant access. However, if the identified location of the location module is not within a predetermined distance from the presented authentication factor and/or the access control system to which the authentication factor was presented and/or an access panel of the access control system that received the request from the authentication factor, then systems and methods can deny or restrict access.

Systems and methods disclosed herein can prevent and/or minimize the misuse of authentication factors, including stolen or duplicated authentication factors. For example, if an authentication factor is duplicated in an unauthorized manner, an access control system will not grant access to the duplicated authentication factor because the duplicated authentication factor will not be employed by the authorized user of the original authentication factor and thus, will not be within a predetermined distance of the authorized user's location module.

Systems and methods disclosed herein can also assist in ensuring that recorded event information is accurate. For example, an access denied event can be recorded, and a location of an authorized user of an authentication event can be recorded during an access denied event. Such information may be useful in future forensic analysis.

FIG. 1 is a flow diagram of a method 100 of issuing an authentication factor in accordance with disclosed embodiments. As seen in FIG. 1, the method 100 can include issuing an authentication factor to a user as in 110. For example, issuing the authentication factor can include providing the user with an access card or a PIN number. Then, the method 100 can include identifying a location module, such as a GPS module, owned or possessed the user as in 120 and registering and/or associating the authentication factor issued to the user with the location module owned or possessed by the user as in 130.

Figure 2:
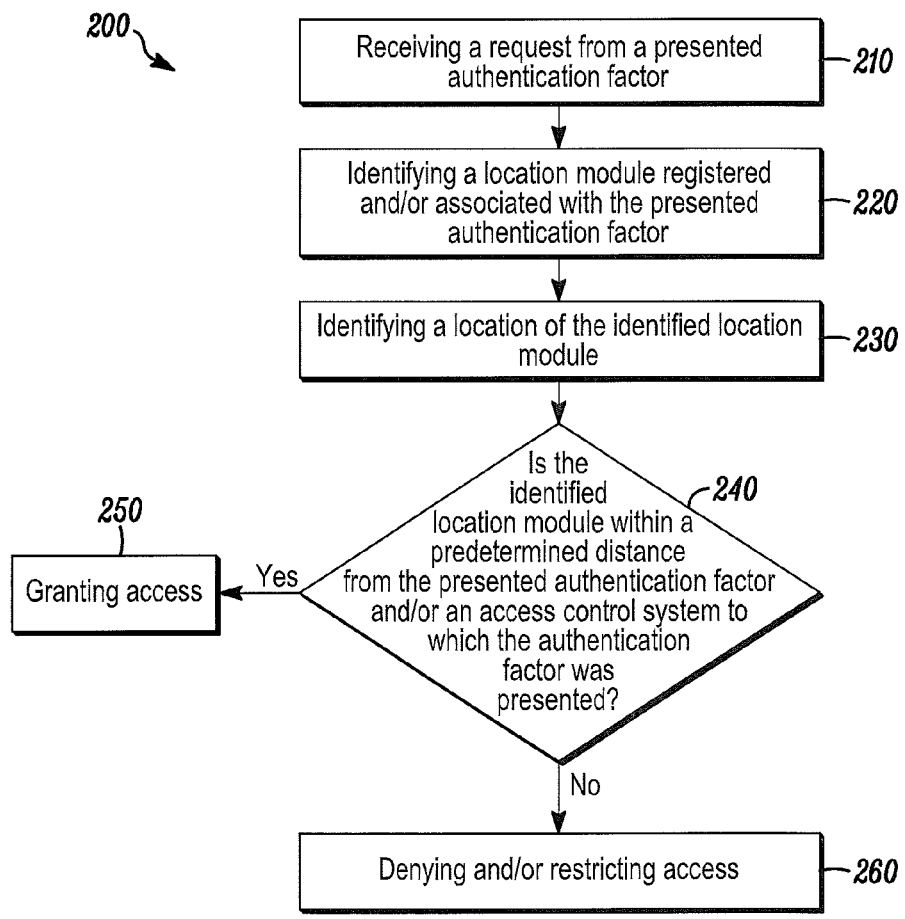
FIG. 2 is a flow diagram of a method of validating an authentication factor in accordance with disclosed embodiments.

FIG. 2 is a flow diagram of a method 200 of validating an authentication factor in accordance with disclosed embodiments. As seen in FIG. 2, the method 200 can include receiving a request from a presented authentication factor as in 210. Then, the method 200 can include identifying a location module, such as a GPS module, registered and/or associated with the presented authentication factor as in 220 and identifying a location of the identified location module as in 230.

Once the location of the location module is identified as in 230, the method 200 can determine whether the identified location module is within a predetermined distance from the presented authentication factor and/or an access control system to which the authentication factor was presented as in 240. For example, the method 200 can determine whether the identified location module is within a predetermined distance from an access panel of an access control system that received the request from the presented authentication factor. If the location module is within the predetermined distance, then the method can grant access as in 250. However, if the location module is not within the predetermined distance, then the method can deny and/or restrict access as in 260. Thus, the method 200 can verify that the user presenting the authentication factor as in 210 is the same as or authorized by the user is possession of the associated location module, that is, the user that is authorized to use the authentication factor.

Figure 3:
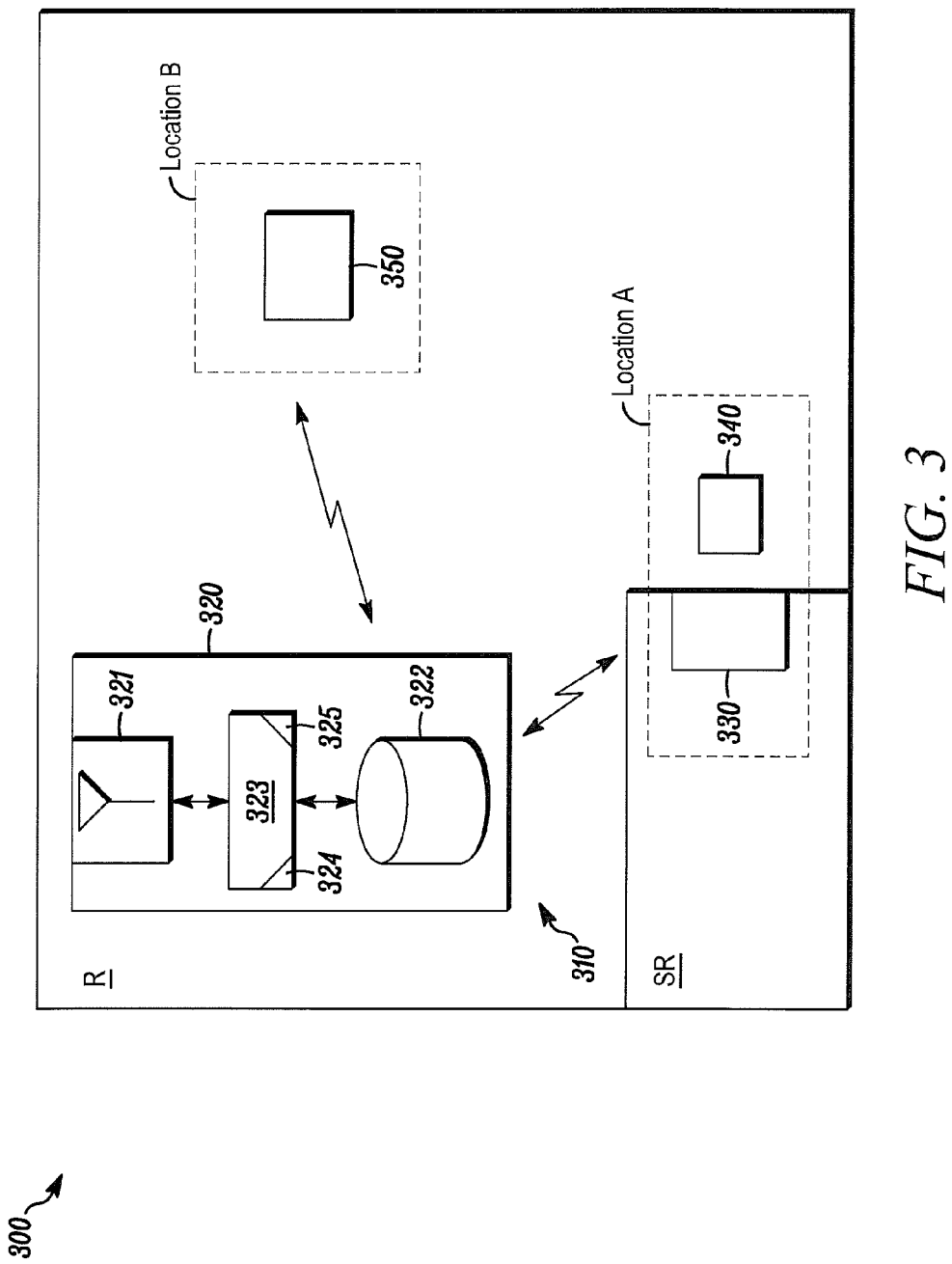
FIG. 3 is a block diagram of a system for carrying out the method of FIG. 1, FIG. 2, and others in accordance with disclosed embodiments.

FIG. 3 is a block diagram of a system 300 for carrying out the method of FIG. 1, FIG. 2, and others in accordance with disclosed embodiments. As seen in FIG. 3, the system 300 can include an access control system 310 in a region R, at least one authentication factor 340, and at least one location module 350. The access control system 310 can include a control panel 320 and at least one access panel 330, for example, a reader for reading an access card or a keypad for receiving a PIN number.

As seen in FIG. 3, the control panel 320 can include a wired and/or wireless transceiver 321 for communicating with the access panel 330 and the location module 350. The control panel 320 can also include a memory device 322, control circuitry 323, one or more programmable processors 324, and executable control software 325. The executable control software 325 can be stored on a transitory or non-transitory computer readable medium, including but not limited to, computer memory, RAM, optical storage media, magnetic storage media, flash memory, and the like. In some embodiments, the executable control software 325 can execute the steps of the methods 100 and 200 shown in FIG. 1, and FIG. 2, respectively, as well as others disclosed herein.

For example, the access panel 330 can be at location A within the region R and can provide security to the sub-region SR. When the authentication factor 340 and a user of the authentication factor 340 are also at location A, the user can present the authentication factor 340 to the access panel 330. The access panel 330 can communicate with the control panel 320, via the transceiver 321, to identify the authentication factor 340. Then, the control panel 320 can access the memory device 322 to identify a location module, for example, the location module 350, that is registered and/or associated with the authentication factor 340.

Once the location module 350 is identified, the control panel 320 can communicate with the location module 350, via the transceiver 321, to identify the location of the location module 350 and accordingly, the location of a user of the location module 350. For example, in some embodiments, the location module 350 can transmit data to the transceiver 321 with location data. The location data can indicate that the location module 350 is at location A, location B, or any other location where the location module 350 is located. In some embodiments, the location module 350 can run a software application or program that identifies the location of the module 350, for example, using GPS coordinates. Then, such data coordinates can be transmitted to the transceiver 321.

After the control panel 320 receives data indicating the location of the location module 350, the control panel 320 can determine if the location of the location module 350 is within a predetermined distance from the access panel 330 and/or the authentication factor 340. For example, if the control panel 320 determines that the location module 350 is at location A, and thus, that the user of the location module 350 is in the same location A as the user of the authentication factor 340 and that the user of the location module 350 is likely the same as the user of the authentication factor 340, then the control panel 320 can authorize the authentication factor 340. If the control panel 320 determines that the location module 350 is at location B, then the control panel can determine whether location B is within a predetermined distance from location A. If the control panel 320 determines that location B is within the predetermined distance from location A, and thus, that the user of the location module 350 is within the predetermined distance from the user of the authentication factor 340 and that the user of the authentication factor 340 is likely the same as or authorized by the user of the location module 350, then the control panel 320 can authorize the authentication factor 340. However, if the control panel 320 determines that location B is not within the predetermined distance from location A, and thus, that the user of the location module 350 is not within the predetermined distance from the user of the authentication factor 340 and that the user of the authentication factor 340 is not likely the same as or not authorized by the user of the location module 350, then the control panel 320 can reject the authentication factor 340.

If the control panel 320 authorizes the authentication factor 340, then the control panel 320 can communicate with the access panel 330, via the transceiver 321, to grant the authentication factor 340 and a user thereof access to the secured sub-region SR. However, if the control panel 320 rejects the authentication factor 340, then the control panel 320 can communicate with the access panel 330, via the transceiver 321, to deny or restrict the authentication factor 340 and a user thereof access to the secured sub-region SR.

In some embodiments, when the control panel 320 and the access panel 330 deny or restrict the authentication factor 340 and a user thereof access to the secured sub-region SR, an access denied event can be triggered. The access denied event can be recorded as well as the location of the location module 350 during the access denied event. When the user in possession of the location module 350 is the authorized user of the authentication factor 340, the recording of the access denied event and the location of location module 350 during the access denied event can be used as evidence of misuse of the authentication factor 340. That is, such recordation can be evidence that the authentication factor 340 is being used by an unauthorized user.

In some embodiments, when an access denied event is triggered, systems and methods can trigger video recording and/or streaming of an area in and around the access panel 330 to determine the identity of the user improperly using the authentication factor 340.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method comprising:
control circuitry receiving a request from an authentication factor;
control circuitry identifying a location module associated with the authentication factor;
control circuitry identifying a location of the location module;
control circuitry determining whether the location module is within a predetermined distance from the authentication factor or a control system that received the request from the authentication factor;
when the location module is within the predetermined distance from the authentication factor or the control system that received the request from the authentication factor, control circuitry granting the request received from the authentication factor; and
when the location module is not within the predetermined distance from the authentication factor or the control system that received the request from the authentication factor, control circuitry denying the request received from the authentication factor.

2. The method of claim 1 wherein receiving the request from the authentication factor includes reading an access card or receiving a PIN number.

3. The method of claim 1 wherein receiving the request from the authentication factor includes receiving a request for access to a secured area.

4. The method of claim 1 wherein identifying the location module associated with the authentication factor includes identifying the location module owned by a user authorized to use the authentication factor.

5. The method of claim 1 wherein identifying the location of the location module includes identifying location coordinates of the location module.

6. The method of claim 1 wherein identifying the location of the location module includes identifying GPS coordinates of the location module.

7. The method of claim 1 wherein identifying the location of the location module includes receiving location coordinates that identify the location of the location module.

8. The method of claim 1 wherein granting the request received from the authentication factor includes granting access to a secured area.

9. The method of claim 1 wherein denying the request received from the authentication factor includes denying or restricting access to a secured area.

10. The method of claim 1 further comprising, when the location module is not within the predetermined distance from the authentication factor or the control system that received the request from the authentication factor, recording the location of the location module.

11. The method of claim 1 further comprising, when the location module is not within the predetermined distance from the authentication factor or the control system that received the request from the authentication factor, recording an area in which the authentication factor is located.

12. An apparatus comprising:
a transceiver;
a memory device;
a programmable processor; and
executable control software stored on a non-transitory computer readable medium,
wherein the transceiver receives a request from an access control panel communicating with an authentication factor,
wherein the programmable processor and the executable control software access the memory device to identify a location module associated with the authentication factor,
wherein the programmable processor and the executable control software identify a location of the location module,
wherein the programmable processor and the executable control software determine whether the location module is within a predetermined distance from the authentication factor or the access control panel,
wherein, when the location module is within the predetermined distance from the authentication factor or the access control panel, the transceiver transmits data to the access control panel to grant the request received from the authentication factor, and
wherein, when the location module is not within the predetermined distance from the authentication factor or the access control panel, the transceiver transmits data to the access control panel to deny the request received from the authentication factor.

13. The apparatus of claim 12 wherein the transceiver receiving the request from the access control panel communicating with the authentication factor includes the transceiver receiving a request for the authentication factor to receive access to an area secured by the access control panel.

14. The apparatus of claim 12 wherein the programmable processor and the executable control software identifying the location module associated with the authentication factor includes the programmable processor and the executable control software identifying the location module owned by a user authorized to use the authentication factor.

15. The apparatus of claim 12 wherein the programmable processor and the executable control software identifying the location of the location module includes the programmable processor and the executable control software identifying location coordinates of the location module.

16. The apparatus of claim 12 wherein the programmable processor and the executable control software identifying the location of the location module includes the transceiver receiving location coordinates from the location module.

17. The apparatus of claim 12 wherein the transceiver transmitting data to the access control panel to grant the request received from the authentication factor includes the transceiver transmitting data to the access control panel to grant access to an area secured by the access control panel.

18. The apparatus of claim 12 wherein the transceiver transmitting data to the access control panel to deny the request received from the authentication factor includes the transceiver transmitting data to the access control panel to deny or restrict access to an area secured by the access control panel.

19. A system comprising:
an access control system, the access control system including at least an access panel in communication with a control panel, the control panel including at least a transceiver, a memory device, and control circuitry;
at least one authentication factor; and at least one location module associated with the authentication factor, wherein the access control system receives a request from the authentication factor, wherein the access control system identifies the location module as being associated with the authentication factor, wherein the access control system identifies a location of the location module;

wherein the access control system determines whether the location module is within a predetermined distance from the authentication factor or the access control system, wherein, when the location module is within the predetermined distance from the authentication factor or the access control system, the access control system grants the request received from the authentication factor, and wherein, when the location module is not within the predetermined distance from the authentication factor or the access control system, the access control system denies the request received from the authentication factor.

20. The system of claim 19 wherein the access control system identifying the location of the location module includes the access control system receiving location data from the location module.

* * * * *